United States Patent [19]

Miyabayashi et al.

[11] Patent Number: 4,530,517

[45] Date of Patent: Jul. 23, 1985

[54] INSTRUMENT PANEL STRUCTURE OF AUTOMOTIVE VEHICLE

[75] Inventors: Yoshiyuki Miyabayashi, Tokyo; Hiroshi Koyachi, Sagamihara; Yukihiro Kurosawa, Omiya, all of Japan

[73] Assignee: Nissan Motor Company, Limited, Yokohama, Japan

[21] Appl. No.: 434,624

[22] Filed: Oct. 15, 1982

[30] Foreign Application Priority Data

Oct. 23, 1981 [JP] Japan .................. 56-169642

[51] Int. Cl.³ .............. B60R 21/02; B62D 25/14; B60N 3/02
[52] U.S. Cl. ..................... 280/752; 296/70; 296/71; 296/189; 180/90
[58] Field of Search ............... 296/70-74, 296/189; 180/90; 280/751, 752

[56] References Cited

U.S. PATENT DOCUMENTS

| 2,818,933 | 1/1958 | Tell ........................... 180/90 |
| 2,822,187 | 2/1958 | Bibbs .......................... 280/752 |
| 3,876,228 | 4/1975 | Hawkins et al. ............. 180/90 |
| 3,888,506 | 6/1975 | Haas ............................ 280/751 |
| 3,966,227 | 6/1976 | Cameron ..................... 280/752 |

Primary Examiner—Robert B. Reeves
Assistant Examiner—Dennis H. Pedder
Attorney, Agent, or Firm—Lane, Aitken & Kananen

[57] ABSTRACT

An instrument panel structure of an automotive vehicle, comprising an upper panel member having a rear end portion extending laterally or transversely of the vehicle, and a protective pad assembly covering and upwardly protruding from the upper surface of the rear end portion and detachably secured to the particular portion of the panel structure, wherein the protective pad assembly preferably comprises a hollow, elongated pad member formed of a resilient material and having a generally U-shaped cross section, and an elongated inner reinforcement member having a generally U-shaped cross section and embedded in the pad member.

1 Claim, 5 Drawing Figures

INSTRUMENT PANEL STRUCTURE OF AUTOMOTIVE VEHICLE

FIELD OF THE INVENTION

The present invention relates to an instrument panel structure of an automotive vehicle.

SUMMARY OF THE INVENTION

In accordance with the present invention, there is provided an instrument panel structure of an automotive vehicle, comprising an upper panel member having a rear end portion extending laterally of the vehicle; and a protective pad assembly covering and upwardly protruding from the upper surface of the rear end portion and detachably secured to the particular portion of the panel structure. In the instrument panel structure thus constructed and arranged, the protective pad assembly preferably comprises a hollow, elongated pad member formed of a resilient material and having a generally U-shaped cross section, and an elongated inner reinforcement member having a generally U-shaped cross section and embedded in the pad member.

BRIEF DESCRIPTION OF THE DRAWINGS

The drawbacks of a prior-art instrument panel structure and the features and advantages of an instrument panel structure according to the present invention will be more clearly understood from the following description taken in conjunction with the accompanying drawings in which like reference numerals designate similar or corresponding structures, members and elements and in which.

DESCRIPTION OF THE PRIOR ART

An automotive vehicle has an instrument panel structure having various switches, instruments and accessories built therein. In order to protect an occupant of the front seat of the vehicle from injury during a frontal collision of the vehicle, such an instrument panel structure is usually provided with a resilient protective pad covering the outer surfaces of the panel structure.

Figure 1:
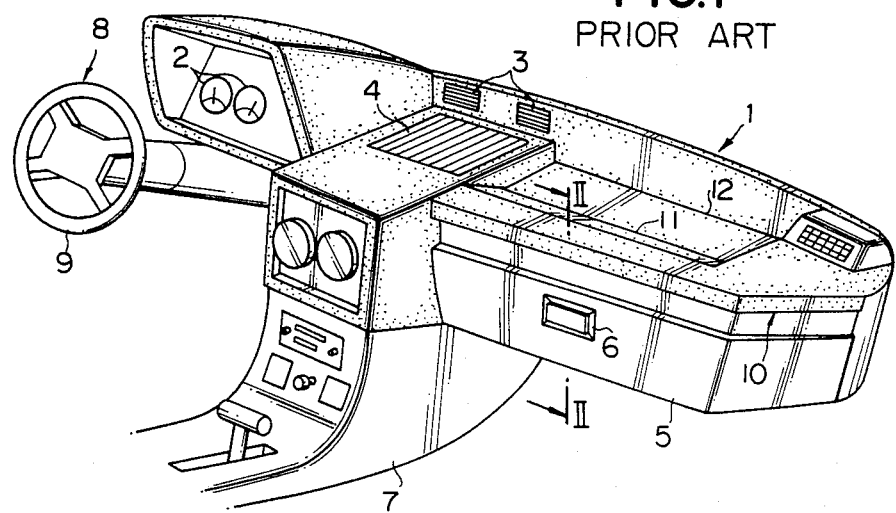
FIG. 1 is a perspective view showing a prior-art instrument panel structure of an automotive vehicle.

In FIG. 1 of the drawings, a prior-art instrument panel structure 1 is shown having built therein instruments 2, conditioning air outlets 3, a radio and/or stereo speaker 4 and a glove compartment 5 including a glove block 6 and is integral with a console box 7 positioned between the front driver's and front guest passenger's seats (not shown). A steering wheel and column assembly 8 is provided in front of the driver's seat and includes a steering wheel 9 positioned at the rear of a lateral half of the instrument panel structure 1. The instrument panel structure 1 thus arranged is provided with a resilient protective pad 10 covering all the upper surfaces of the panel structure 1. The protective pad 10 has formed in front of the front guest passenger's seat an upwardly protruding hand rest portion 11 longitudinally extending laterally or transversely of the vehicle body and, immediately in front of the hand rest portion 11, a horizontal depression 12 to serve as a pocket to accommodate some articles therein. The hand rest portion 11 of the protective pad 10 is provided to enable the occupant of the passenger's seat to lay his hands on the hand rest portion 11 and to have his weight received on the instrument panel structure 1 when, for example, the vehicle is caused to violently sway or suddenly decelerate.

Figure 2:
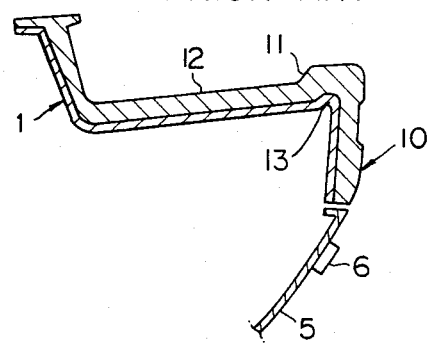
FIG. 2 is a cross sectional view taken on a vertical plane indicated by line II—II in FIG. 1.

The instrument panel structure 1 is formed with a ridge portion 13 extending along the hand rest portion 11 and securing the hand rest portion 11 of the protective pad 10 to the instrument panel structure 1 as shown in FIG. 2. The ridge portion 13 of the instrument panel structure 1 adds to the rigidity of the instrument panel structure 1 in a region containing the particular portion of the panel structure 1 so that, during a frontal collision of the vehicle, the front guest passenger laying his hands on the hand rest portion 11 could not avoid encountering a violent impact. If the ridge portion 13 is shaped to have reduced rigidity to reduce the impact to be applied to the passenger during such an accident, the instrument panel structure 1 will be damaged or destroyed by an impact applied to the instrument panel structure 1 and will become useless. The instrument panel structure 1 thus rendered useless must be exchanged with a new one together with the various switches, instruments and accessories incorporated therein and will entail an unnecessary expense on the user of the vehicle. The present invention contemplates solution of these problems which have thus far been inherent in a prior-art instrument panel structure 1 of the described nature.

DESCRIPTION OF THE PREFERRED EMBODIMENTS

Figure 3:
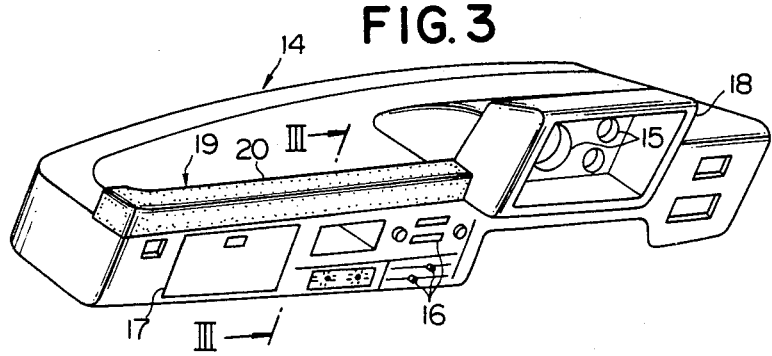
FIG. 3 is a perspective view showing a preferred embodiment of an instrument panel structure according to the present invention.

Turning to FIG. 3 of the drawings, an instrument panel structure embodying the present invention, now designated in its entirety by reference numeral 14, is shown having incorporated therein instruments 15, radio and air conditioner switches 16 and a glove compartment 17. The instrument panel structure 14 has a hood portion 18 hanging over the instruments 15. While the panel depicted in FIG. 3 is for a right side drive vehicle, the invention is clearly suited for a left side drive vehicle by reversing the respective orientation of components.

The instrument panel structure 14 thus arranged is provided with a protective pad 19 covering and upwardly protruding from the upper surface of a rear end portion of an upper panel member 20 of the panel structure 14 and detachably secured to the particular portion of the panel member 20. The protective pad assembly 19 longitudinally extends laterally or transversely of the instrument panel structure 14 between one end of the instrument panel structure 14 and the hood portion 18 of the panel structure 14 and is located above the radio and air conditioner switches 16 and the glove compartment 17 as shown. As will be better seen from FIG. 4 of the drawings, the protective pad assembly 19 is composed of a hollow, elongated pad member 21 formed of a suitable resilient material and having a generally U-shaped cross section and an elongated inner reinforcement member 22 also having a generally U-shaped cross section and embedded in the pad member 21. The inner reinforcement member 22 is formed of a sheet metal.

Figure 4:
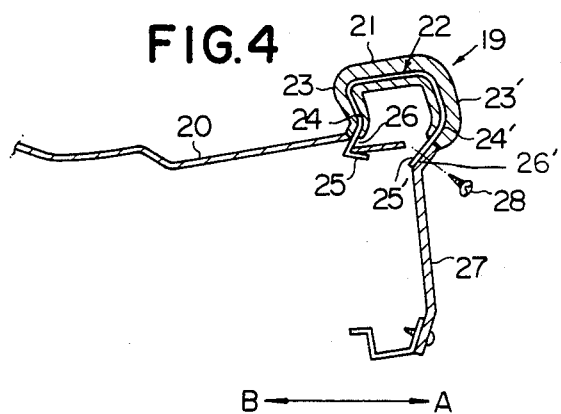
FIG. 4 is a cross sectional view taken on a vertical plane indicated by line IV—IV in FIG. 3.
Figure 5:
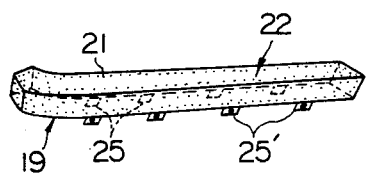
FIG. 5 is a perspective view showing a protective pad assembly forming part of the instrument panel structure shown in FIGS. 3 and 4.

The pad member 21 has downwardly directed front and rear longitudinal edge portions 23 and 23' which are spaced apart in a fore-and-aft direction B-A of the instrument panel structure 14. The front longitudinal edge portion 23 downwardly protrudes toward and terminates at the upper surface of the rear end portion of the upper panel member 20 of the instrument panel structure 14. On the other hand, the inner reinforcement member 22 extends between the vicinity of one longitudinal end and the vicinity of the other longitudinal end of the pad member 21 and has front and rear longitudinal edge portions 24 and 24' which are embedded in the longitudinal edge portions 23 and 23', respectively, of the pad member 21. The inner reinforcement member 22 further has a series of front tag portions 25 which are bent in fore-and-aft directions of the instrument panel structure 14, viz., generally rearwardly as shown in FIG. 4 and a series of rear tag portions 25' projecting downwardly from the lower end of the rear longitudinal edge portion 24' of the inner reinforcement member 22. The instrument panel structure 14 has a rear panel member 27 and a series of front slots 26 formed in the rear end portion of the upper panel member 20 thereof and a series of rear slots 26' formed in a rear panel member 27 of the instrument panel structure 14. The protective pad assembly 19 is detachably secured to the instrument panel structure 14 with the front and rear tag portions 25 and 25' of the inner reinforcement member 22 fitted to the rear end portion of the panel member 20 and the rear panel member 27 through these slots 26 and 26', respectively, and with the rear tag portions 25' securely attached to the rear panel member 27 of the instrument panel structure 14 by suitable releasable fastening means such as self-tapping screws 28.

The protective pad assembly 19 of the instrument panel structure 14 embodying the present invention is adapted to be gripped by the occupant of the assistant driver's seat of the vehicle so as to enable him to have his weight received on the instrument panel structure 14 when, for example, the vehicle is caused to violently sway or suddenly decelerate. Thus, the inner reinforcement member 22 of the protective pad assembly 19 is preferably so shaped that the front and rear longitudinal edge portions 23 and 23' of the pad member 21 respectively protrude forwardly and rearwardly of the vehicle body, viz., in directions indicated by arrows A and B, respectively, in FIG. 4.

When the vehicle equipped with the instrument panel structure 14 constructed and arranged as described above encounters sudden deceleration as during a frontal collision or is caused to sway violently on a rain-wet, muddy or icy road surface, the occupant of the guest passenger's seat is able to securely grasp the protective pad assembly 19 by his hand or hands and to thereby support his body safely at the rear of the instrument panel structure 14. In case the occupant is flung against the instrument panel structure 14 and is struck by the protective pad assembly 19, the hollow construction of the protective pad assembly 19 permits deformation of the inner reinforcement member 22 and thus effectively absorbs the impact transferred from the occupant to the protective pad assembly 19. If the protective pad assembly 19 is damaged or destroyed by such deformation of the inner reinforcement member 22, the protective pad assembly 19 as a whole can be readily exchanged with a new one without exchanging the instrument panel structure 14 per se. For this purpose, the protective pad assembly 19 to be exchanged with a new one can be removed from the instrument panel structure 14 by loosening the self-tapping screws 28 from the rear tag portions 25' of the inner reinforcement member 22 and thereafter pulling the front and rear tag portions 25 and 25' of the inner reinforcement member 22 from the slots 26 and 26', respectively, in the instrument panel structure 14.

Though not shown in the drawings, an unoccupied portion of the upper panel member 20 of the instrument panel structure 14 may be formed with an upwardly open depression to be used for the accommodation of some articles and/or may be covered with a relatively thin pad if desired.

What is claimed is:

1. An instrument panel structure of an automotive vehicle comprising:

an upper panel member having a rearmost marginal portion extending laterally of the vehicle; and a protective pad assembly detachably secured to said rearmost marginal portion of the panel member, wherein said protective pad assembly is in its entirety elongated along said rearmost marginal portion of the panel member substantially in ridge form and has a generally inverted U-shaped cross section protruding upwardly from said rearmost marginal portion of said panel member forming between the upper surface of said marginal portion and the inner surface of the pad assembly a cavity which is elongated throughout the length of the pad assembly, the pad assembly being exposed upwardly on the rearmost marginal portion of the panel member to enable a front seat occupant to grasp the pad assembly by hand while being seated on a front seat of the vehicle, said protective pad assembly comprising a hollow elongated pad member formed of a resilient material and having a generally inverted U-shaped cross section, and an elongated inner reinforcement member which has a generally inverted U-shaped cross section substantially similar to the cross section of said pad member and which is at least partially embedded in the pad member, said pad member having downwardly directed front and rear longitudinal edge portions spaced apart in a fore-and-aft direction of the instrument panel structure, the front longitudinal edge portion downwardly protruding toward and terminating at the upper surface of the rearmost marginal portion of said upper panel member, and said inner reinforcement member extending between the vicinity of one longitudinal end and the vicinity of the other longitudinal end of the pad member and having front and rear longitudinal edge portions which are embedded in the longitudinal edge portions, respectively, of the pad member, said inner reinforcement member further having a first series of front tag portions which are bent in fore-and-aft directions of the instrument panel structure and which project outwardly from the lower end of the front longitudinal edge portion of the inner reinforcement member and a second series of rear tag portions which project downwardly from the lower end of the rear longitudinal edge portion of the pad member, the instrument panel structure further having a rear panel member and being formed with a series of front slots formed in the rearmost marginal portion of the upper panel member thereof and a series of rear slots formed in an uppermost marginal portion of said rear panel member, the protective pad assembly being detachably secured to the instrument panel structure with the front tag portions of the inner reinforcement member fitted respectively to the rearmost marginal portion of said upper panel member through said series of front slots and with the rear tag portions securely attached to said rear panel member by releasable fastening means through said series of rear slots, respectively.

* * * * *